United States Patent [19]

Fukui

[11] 4,256,067
[45] Mar. 17, 1981

[54] OBLONG PISTON RINGS FOR INTERNAL COMBUSTION ENGINE

[75] Inventor: Takeo Fukui, Tokyo, Japan

[73] Assignee: Honda Giken Kogyo Kabushiki Kaisha, Tokyo, Japan

[21] Appl. No.: 26,667

[22] Filed: Apr. 3, 1979

[30] Foreign Application Priority Data

Apr. 7, 1978 [JP] Japan .................... 53/44865[U]
Jun. 21, 1978 [JP] Japan .................... 53/84036[U]

[51] Int. Cl.³ ...................... F02F 3/00; F16J 1/02; F02F 5/00
[52] U.S. Cl. .................... 123/193 P; 92/177; 277/218
[58] Field of Search .......... 123/191 R, 193 R, 193 P, 123/197; 92/177; 277/216, 218, 192–197

[56] References Cited

U.S. PATENT DOCUMENTS

| | | | |
|---|---|---|---|
| 1,446,658 | 2/1923 | Pelletier | 277/198 |
| 1,747,306 | 2/1930 | Kolobziej | 92/177 |
| 2,257,417 | 9/1941 | Kelly | 92/177 |
| 2,409,555 | 10/1946 | Gaboux et al. | 92/177 |
| 3,090,320 | 5/1963 | Hummer et al. | 277/218 |

FOREIGN PATENT DOCUMENTS

| | | | |
|---|---|---|---|
| 219351 | 1/1962 | Austria | 277/193 |
| 142516 | 5/1920 | United Kingdom . | |
| 469883 | 8/1937 | United Kingdom . | |
| 1049727 | 11/1966 | United Kingdom . | |
| 1388904 | 3/1975 | United Kingdom . | |

*Primary Examiner*—Craig R. Feinberg
*Attorney, Agent, or Firm*—Lyon & Lyon

[57] ABSTRACT

An internal combustion engine has an oblong piston mounted to reciprocate within an oblong cylinder. The piston is elongated in a direction parallel to the axis of the crankshaft and is provided with piston rings which have sliding contact with the surface of the oblong cylinder. Each piston ring is split and is formed of at least two segments. Gaps may be provided between adjacent ends of the segments and stationary pins fixed on the piston may be received in these gaps. The gaps on one piston ring are misaligned with respect to the gaps on another piston ring.

4 Claims, 6 Drawing Figures

OBLONG PISTON RINGS FOR INTERNAL COMBUSTION ENGINE

This invention relates to internal combustion engines and is particularly directed to improvements which include oblong pistons mounted to reciprocate in sliding contact with oblong cylinders, for the purpose of producing a high speed engine having a high horsepower output. A device of this type is shown in the copending application of Irimajiri et al U.S. Ser. No. 22,942 filed Mar. 22, 1979, now abandoned in favor of C-I-P 91,837 filed Nov. 6, 1979, and both applications being entitled "Oblong Piston and Cylinder for Internal Combustion Engine". That application is incorporated herein by reference. A difficulty which arises with increase in the speed of engine revolutions is that piston rings of conventional type comprising a split member having one gap tend to flutter in regions near the gap; the opposing ends of the piston ring that form the gap vibrate and permit gas leakage in volumes that are unacceptable.

The object of the present invention is to provide split piston rings which are capable of high speed operation without fluttering at the gaps. Each split piston ring may comprise two duplicate segments, the gaps between the ends of the segments being located at positions 180 degrees apart. Moreover, adjacent split piston rings are mounted so that the gaps of one piston ring are located in an offset peripheral relationship with the gaps on the other piston ring. The gaps may be located at the ends of the long axis of the oblong piston or at the short axis of the piston at right angles thereto. Also, the gaps may be located where the end of a straight section of one segment adjoins the end of a curved section of another segment. In either case, the gaps on one split piston ring are misaligned with the gaps on an adjacent split piston ring.

In a modified form of the invention, the gaps between ends of segments are positioned where a straight, or arched, section adjoins a curved end section. This tends to compensate for any discrepancy in the cylinder wall where the similar straight, or arched, sections merge with the curved end sections.

In another form of the invention, each piston ring has four segments; two are straight or arched, and two are curved so that they form a part of a circle in cross section.

In all forms of the invention, a corrugated spring contacts inside faces of each of the piston ring segments to urge the segments into close sliding contact with the cylinder wall.

Other objects and advantages will appear hereinafter.

Figure 1:
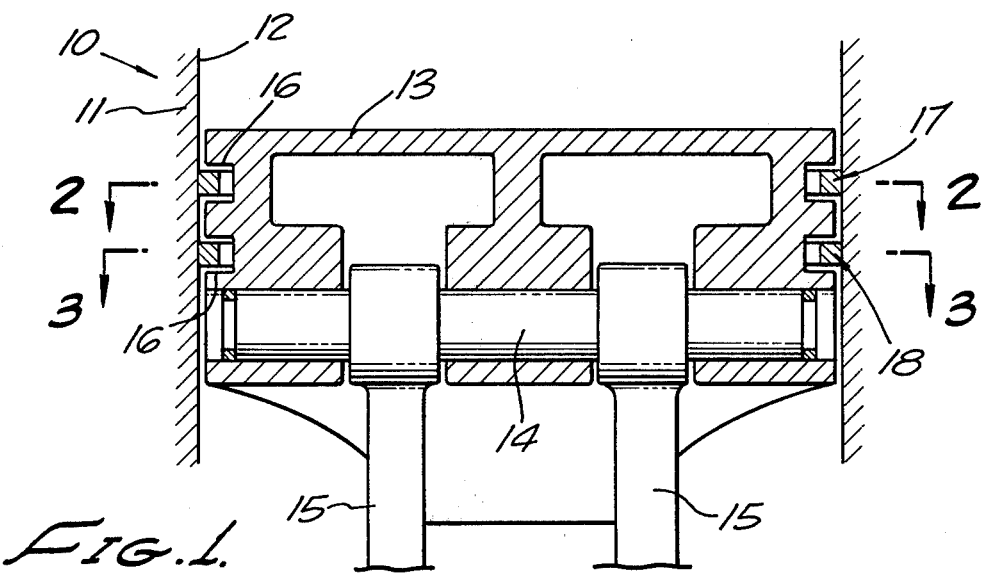
FIG. 1 is a sectional side elevation showing piston rings which constitute a preferred embodiment of this invention.

Referring to the drawings, an internal combustion engine generally designated 10 has a body or block 11 provided with one or more cylinders 12. A piston 13 reciprocates in the cylinder 12 but the cooperating sliding surfaces of each piston and cylinder are not cylindrical. Instead, each piston and cylinder are elongated in a direction parallel to the rotary axis of the piston pin 14 which receives the connecting rods 15, and parallel to the crankshaft (not shown). Each cylinder 12 is oblong, that is, having a greater dimension in one direction than in another direction at right angles thereto. The cylinder 12 has curved ends which preferably constitute a part of a circle, in cross section, these curved ends being joined by side surfaces which are preferably in the form of parallel planes. However, the side surfaces may be arched to increase the lateral dimensions of the cylinder, or the cross section of the cylinder may be in the form of an ellipse. It is intended that the term "oblong" cover any of these shapes. Each cylinder 12 is symmetrical about a plane passing through the longest of the cylinder cross sections.

Figure 2:
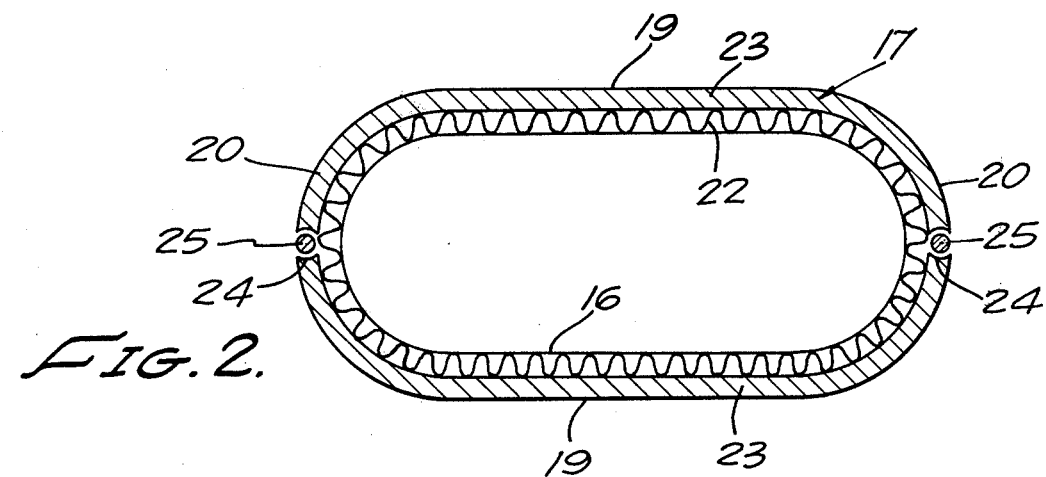
FIG. 2 is a sectional plan view taken substantially on the lines 2—2 as shown in FIG. 1.
Figure 3:
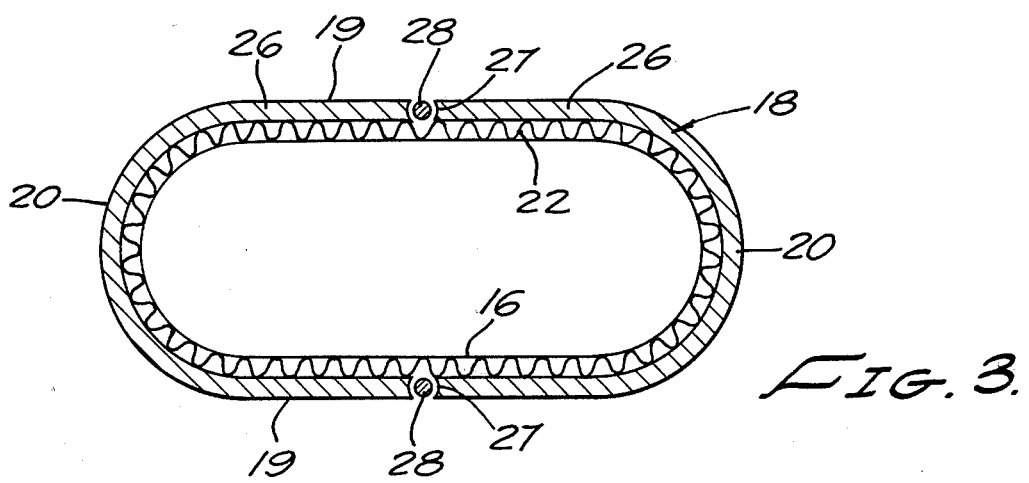
FIG. 3 is a sectional plan view taken substantially on the lines 3—3 as shown in FIG. 1.

As shown in FIGS. 1–3, the oblong piston 13 has parallel grooves 16 receiving split piston rings 17 and 18. The outer surfaces of these split piston rings have the same shape as the cross section of the cylinder 12. In the preferred embodiment shown in FIGS. 2 and 3, each piston ring has straight parallel side sections 19 which merge into curved end sections 20 which form part of a circle in cross section. A corrugated spring 22 contacts the inner surface of each of the split piston rings 17 and 18, and each corrugated spring is received in one of the piston grooves 16.

The split piston ring 17 comprises two duplicate segments 23. The gaps 24 between the ends of the segments 23 receive stationary pins 25 fixed on the piston 13. Similarly, the split piston ring 18 comprises two duplicate segments 26, and the gaps 27 between the ends of the segments 26 receive stationary pins 28 fixed on the piston 13. The gaps 24 with their pins 25 are spaced angularly 180 degrees from the gaps 27 and their pins 28. These substantial peripheral offsets in the gaps of the split piston rings 17 and 18 act to reduce gas leakage.

Figure 4:
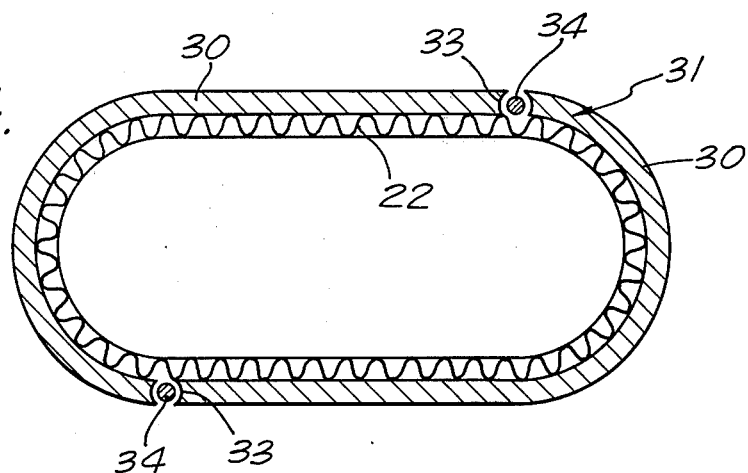
FIG. 4 is a sectional plan view similar to FIG. 2, showing a modification.
Figure 5:
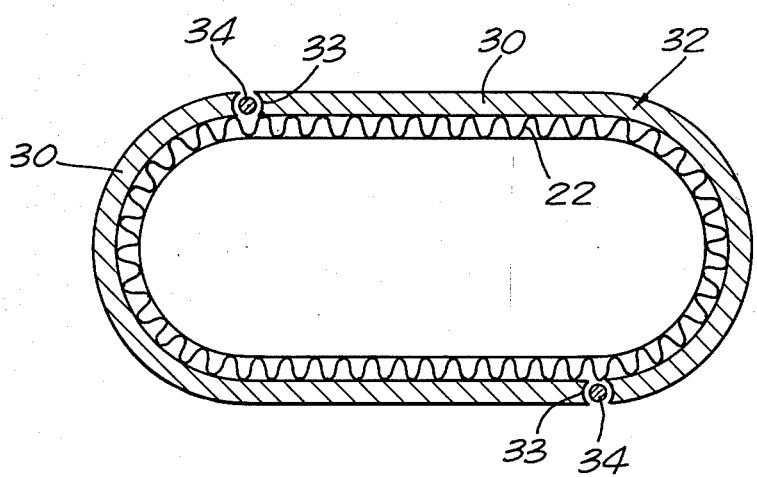
FIG. 5 is a sectional plan view similar to FIG. 3, showing the same modification.

In the modified form of the invention shown in FIGS. 4 and 5, the segments 30 of the split piston rings 31 and 32 are all duplicates and they are shaped and mounted on the piston 13 in the manner described above. The gaps 33 between ends of the segments 30 and the stationary pins 34 received in the gaps are offset 180 degrees between the split piston rings 31 and 32. The gaps 33 are located where the straight side sections merge with the curved end sections of the split piston ring.

Figure 6:
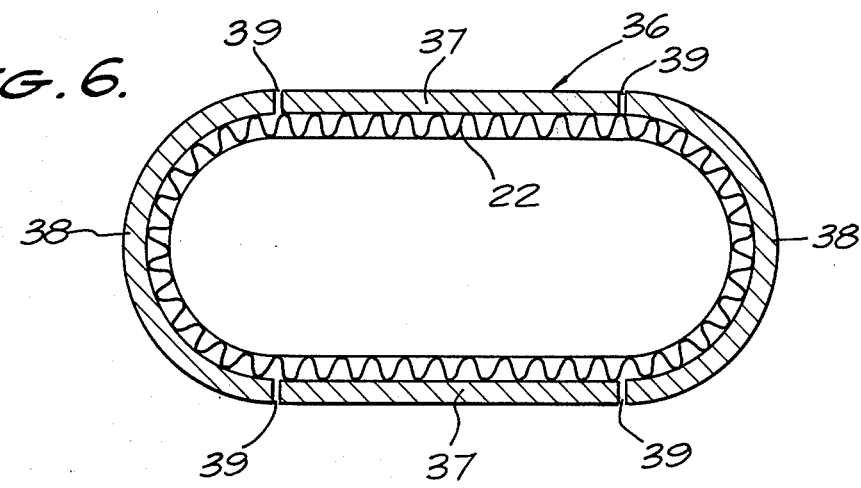
FIG. 6 is a sectional plan view similar to FIG. 2, showing a second modification.

In the second modified form of the invention shown in FIG. 6, the split piston ring 36 is formed of two straight sections 37 and two curved sections 38 which are semi-circular in cross section. Two of these split piston rings 36 are employed, one in each of the grooves 16 on the piston 13. The segments 37 and 38 are easier to machine than the segments previously described. The gaps 39 are very narrow, and pins in the piston such as the pins 25, 28 and 34, previously described, are not employed.

Having fully described my invention, it is to be understood that I am not to be limited to the details herein set forth but that my invention is of the full scope of the appended claims.

I claim:

1. For use in an internal combustion engine having an oblong piston mounted to reciprocate within an oblong cylinder, the piston having a peripheral groove and the cylinder having arcuate end portions, the improvement comprising:

a split piston ring adapted to be received within the peripheral groove and having curved end sections which form part of a circle in cross section and substantially straight side sections, said split piston ring being oblong and having an outer surface shaped for sliding contact with the oblong cylinder, the split piston ring including two duplicate segments each integrally comprising one of said curved end sections and one of said side sections forming substantially a J-shape.

2. The device set forth in claim 1 comprising two duplicate segments having gaps between the ends thereof, and stationary pins on the piston received in said gaps.

3. For use in an internal combustion engine having an oblong piston mounted to reciprocate within an oblong cylinder, the piston having peripheral grooves and the cylinder having arcuate end portions, the improvement comprising:

a split piston ring adapted to be received within one of said peripheral grooves, a second split piston ring adapted to be received within another of said peripheral grooves, each of said split piston rings being oblong and having an outer surface shaped for sliding contact with the oblong cylinder, each split piston ring having curved end sections which form part of a circle in cross-section and substantially straight side sections, each split piston ring including two duplicate segments, each segment integrally comprising one of said curved end sections and one of said side sections forming substantially a J-shape, the segments having adjoining ends forming gaps therebetween, the gaps on one of the split piston rings being misaligned with respect to the gaps on the other split piston ring.

4. The piston rings defined in claim 3 in which stationary pins on the piston are received in each of said gaps.

* * * * *